US008391283B2

(12) United States Patent
Zisapel et al.

(10) Patent No.: US 8,391,283 B2
(45) Date of Patent: Mar. 5, 2013

(54) SYSTEM AND METHOD FOR OBTAINING PHYSICAL LOCATION INFORMATION FOR NETWORKED DEVICES

(75) Inventors: Yehuda Zisapel, Tel Aviv (IL); Amir Forkosh, Netanya (IL); Tzahy Yavnai, Hadera (IL)

(73) Assignees: Yehuda Zisapel, Tel Aviv (IL); Bynet Systems Applications, Ltd., Tel Aviv (IL)

( * ) Notice: Subject to any disclaimer, the term of this patent is extended or adjusted under 35 U.S.C. 154(b) by 828 days.

(21) Appl. No.: 12/499,934

(22) Filed: Jul. 9, 2009

(65) Prior Publication Data
US 2011/0007662 A1    Jan. 13, 2011

(51) Int. Cl.
*H04L 12/28* (2006.01)
(52) U.S. Cl. ........................................ 370/389; 370/254
(58) Field of Classification Search ........................ None
See application file for complete search history.

(56) References Cited

U.S. PATENT DOCUMENTS

| | | | |
|---|---|---|---|
| 7,558,264 B1 * | 7/2009 | Lolayekar et al. | 370/392 |
| 7,898,977 B2 * | 3/2011 | Roese et al. | 370/254 |
| 8,146,160 B2 * | 3/2012 | Orr et al. | 726/23 |
| 2002/0112076 A1 * | 8/2002 | Rueda et al. | 709/245 |
| 2003/0061509 A1 * | 3/2003 | Fisher | 713/201 |
| 2004/0260766 A1 * | 12/2004 | Barros et al. | 709/203 |
| 2005/0060434 A1 * | 3/2005 | Fazal et al. | 709/247 |
| 2008/0310366 A1 * | 12/2008 | Oba et al. | 370/331 |
| 2008/0317021 A1 * | 12/2008 | Ives et al. | 370/389 |

* cited by examiner

*Primary Examiner* — Phirin Sam
(74) *Attorney, Agent, or Firm* — Rothwell, Figg, Ernst & Manbeck, P.C.

(57) ABSTRACT

The invention provides systems and methods for determining the physical location of a device connected to a network. The location information is stored in a wiring database that correlates the location information with an address present in every protocol data unit (PDU) thus enabling a network administrator to quickly locate an offending device. The invention provides systems and methods for validating reported physical location information using network topology. In another aspect, the invention provides systems and methods for maintaining the integrity of a wiring database storing physical locations of devices by motivating users to report relocation of devices to the network administrator.

61 Claims, 5 Drawing Sheets

SYSTEM AND METHOD FOR OBTAINING PHYSICAL LOCATION INFORMATION FOR NETWORKED DEVICES

TECHNICAL FIELD

The present invention relates to the field of communication networks. More specifically, the present invention relates to systems and methods for physically locating devices connected to a network.

BACKGROUND

Modern computer networks deployed in large installations (e.g., datacenters, offices, universities, etc.) may be complex and dynamic, with a large number of end-user computers being continually added, removed, and moved between different physical locations (e.g., from one room, floor, or building to another). Such networks are predominantly Ethernet-based, using copper wiring (e.g., category 5 ("Cat5") cable or category 7 ("Cat7") cable) or fiber-optic cables running between network elements. Communications cabinets or rooms are often deployed with patch panels in order to facilitate installation and modification of network connections.

In certain situations a network administrator needs to physically locate a particular device that is connected to the network. For example, hundreds or thousands of devices may be located in a large datacenter and, at any given time, one or more of these devices may fail and need to be located by the network administrator so that it can be replaced or fixed. As another example, the network administrator may need to locate a computer that is functioning in a way that negatively impacts network functionality (e.g., by transmitting spurious data across the network). As yet another example, the network administrator may need to locate a computer that is being intentionally or unintentionally misused by a user in a way that may endanger valuable information assets. In such cases, the network administrator will need to quickly determine the physical location of the computer or other device in question. Information sufficient to determine the physical location of the device for this purpose may be the room number in which the offending computer resides, and preferably the identification of a physical receptacle on a wall within that room. For reasons that will be described presently, mere identification of the physical layer address or network layer address (a.k.a., "network address") of the device in question will generally not convey information sufficient for this purpose.

Conventional network monitoring equipment can determine a device's network address (e.g., an Internet protocol ("IP") address) and physical layer address (e.g., an Ethernet Media Access Control ("MAC") address) from protocol data units ("PDU"s) transmitted by the device. As used herein the term protocol data unit means data in a format specified by a protocol, which data includes a header containing protocol control information (e.g., address information for routing the protocol data unit) and possibly a data portion containing application data or another protocol data unit. However, this information does not directly reveal the precise physical location of a device. This lapse can be rectified by manually maintaining a wiring diagram that depicts the network topology (i.e. the physical interconnections between the various network elements), along with the addresses and physical locations of all devices. In order to maintain an accurate wiring diagram, entries must be added to the wiring diagram whenever a new device is added to the network, entries must be deleted when devices are removed from service, and entries must be modified every time a device is moved to a different location. Such manual maintenance of the wiring diagram will of necessity be labor-intensive and error-prone, and updating of the wiring diagram is often postponed or neglected. Furthermore, end users may frequently move computers between physical locations without notifying the network administrator, frustrating an administrator's best efforts to maintain an accurate wiring database.

One proposed solution to these problems is to automatically determine network topology information (e.g., information related to the logical and/or physical interconnections between network elements). Determining network topology information can be achieved using standard software utilities (e.g., the 'traceroute' command from the IP suite), special-purpose protocols, management layer functions, software, and possibly additional network hardware. However, the automatically determined network topology information does not completely specify the physical location of a device. For large networks (e.g., hundreds or thousands of devices), mere network topology information will usually be insufficient for determination of physical location.

Other proposed solutions may incorporate new active network elements, such as intelligent patch panels that can be interrogated via the network by the network administrator, or configuring devices to report their physical locations using the Global Positioning System ("GPS"). These solutions add undesirable expense and complexity to the infrastructure of wired networks. Furthermore, because the use of these additional devices is not standardized, implementing these solutions may require extensive software development and integration.

SUMMARY OF THE INVENTION

In view of the foregoing, it would be desirable to provide a mechanism to correlate observable address information (e.g., an IP or MAC address) with precise physical location information, without requiring additional hardware or nonstandard communications protocols.

An object of the present invention is to provide a method for determining the physical location of a device connected to a network. In some embodiments, the method includes the following steps: (a) receiving a protocol data unit ("PDU") emanating from the device in question and observing the physical layer and/or network layer address associated with the device; (b) transmitting to the device a request (e.g., transmitting a simple network management protocol ("SNMP") protocol PDU) for location information stored in a data store on the device, the location information identifying a declared physical location of the device; (c) receiving from the device the requested location information; and (d) storing the received location information in a wiring database such that the received location information is linked with the device's physical layer and/or network address.

In some embodiments, the method also includes: (e) receiving a PDU containing a unique user identity associated with the end user presently logged onto the device (e.g., part of a login sequence according to the terminal access controller access-control system ("TACACS") protocol); and (f) storing the received location information in a wiring database such that the user identity information is linked with the declared location and addresses of the device.

In some embodiments, the data store on the device may comprise an Open Systems Interconnection ("OSI") network management model Management Information Base ("MIB"). In other embodiments, the data store may comprise a NetBIOS Name database. In still other embodiments, the data store may comprise NETCONF configuration data.

In some embodiments, the location information stored in a data store on the device is textual information that describes a declared physical location of the device.

In some embodiments, the data store is not modifiable by an end user of the device.

In some embodiments, the method also includes: (e) determining the topology of the network and from this topology inferring an approximate location of the device. In some embodiments, the method further includes: (f) determining whether the location information obtained in step (c) is consistent with the location determined in step (e); and (g) in response to determining that the location information obtained in step (c) is inconsistent with the location determined in step (e), performing a pre-determined action (e.g., denying the device access to a resource. revoking an Internet protocol (IP) address of the device, revoking a login state of a user logged in through the device, etc.).

In some embodiments the wiring database is stored on a supervisor computer, said supervisor computer including transmit and receive circuitry and a data processing system. In such embodiments, the receive circuitry of the supervisor computer passively observes protocol data units (PDUs) emanating from the device in question and the data processing system records the physical and network addresses associated with the device. The data processing system then initiates a query to the device using the transmit circuitry via the communication network (e.g., an SNMP PDU) requesting location information stored in a data store on the device, the location information identifying a declared physical location of the device, and the receive circuitry then receives from the device the requested location information. The data processing system stores the received addresses and location information in a database such that the received location information is linked with the addresses of the device.

The above and other aspects and embodiments are described below with reference to the accompanying drawings.

BRIEF DESCRIPTION OF THE DRAWINGS

The accompanying drawings, which are incorporated herein and farm part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
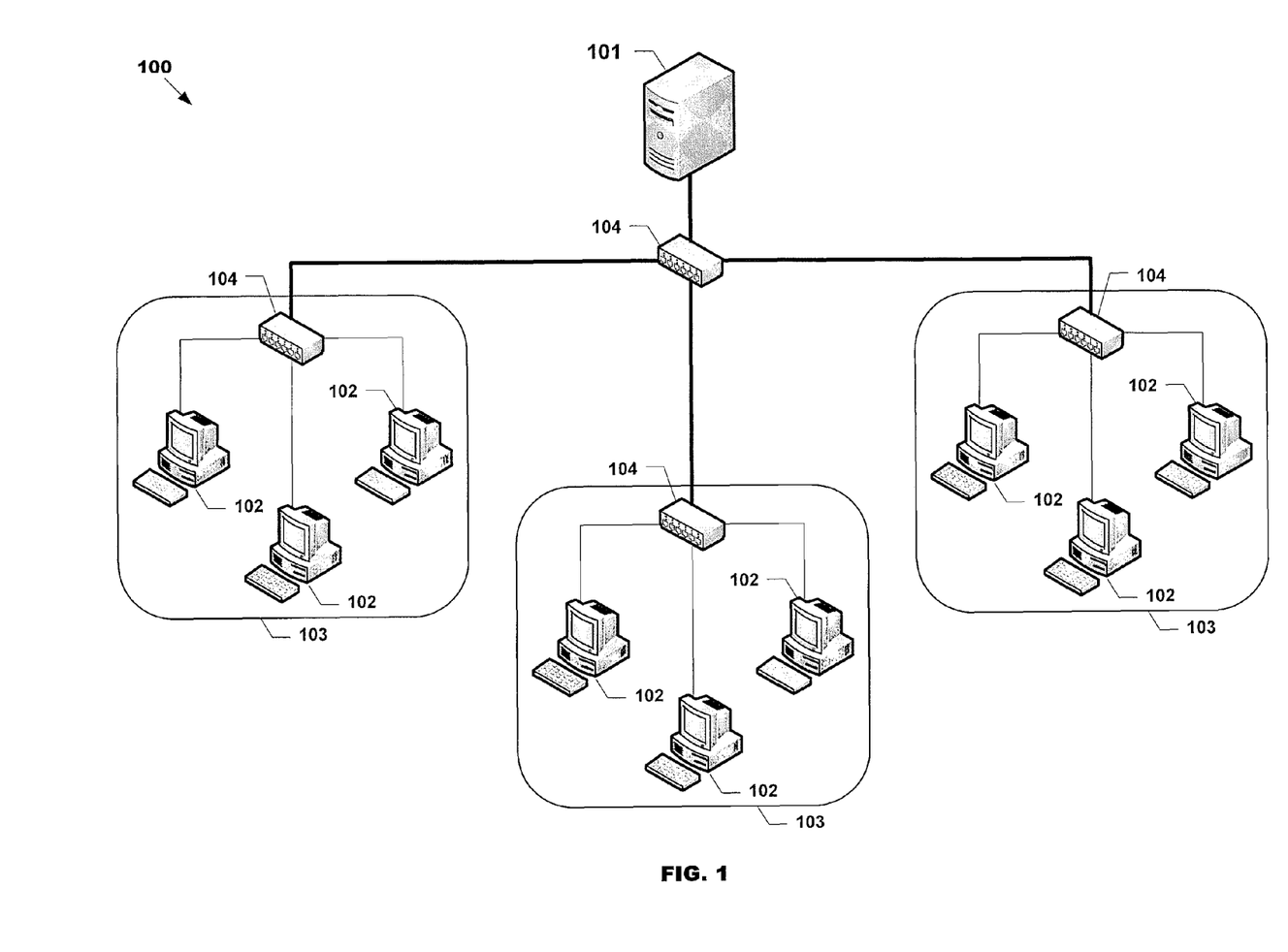
FIG. 1 illustrates a communication network.

Referring to FIG. 1, FIG. 1 illustrates a communication network 100. As shown in FIG. 1, the network 100 includes a supervisor computer 101 (e.g., a personal computer, server, or other communications hardware configured according to aspects of the invention) and a plurality of network devices 102 (e.g., servers, terminals, personal computers, or other devices capable of network communication). As illustrated in FIG. 1, the devices 102 may be located in different physical locations 103. For example, different locations 103 may be different sections of a datacenter, different rooms of an office, different floors of a building, different buildings, etc.

The supervisor computer 101 and the devices 102 may be connected to the network 100 via network switches 104 (e.g., Ethernet switches or IP routers). As illustrated in FIG. 1, in some embodiments, each network switch 104 may provide network access for a corresponding physical location 103.

When a network device 102 is connected to the network (e.g., when the network device 102 is turned on), in some embodiments the network device 102 will perform several protocol transfers that cause a PDU transmitted by device 102 to traverse the network switches 104. These protocol transfers may include acquiring a network address via dynamic host configuration protocol ("DHCP"), logging onto a server via Terminal Access Controller Access-Control System ("TACACS"), requesting Internet protocol ("IP") addresses of resources via domain name system ("DNS") servers, etc.

In some embodiments, the supervisor computer 101 may be configured to passively monitor the traffic across the network switches 104 and detect these protocol transfers (e.g., the PDUs associated with the protocol transfers). In other embodiments, the network switches 104 may be configured to duplicate the PDUs associated with these protocol transfers and transmit those PDUs to the supervisor computer.

Figure 2:
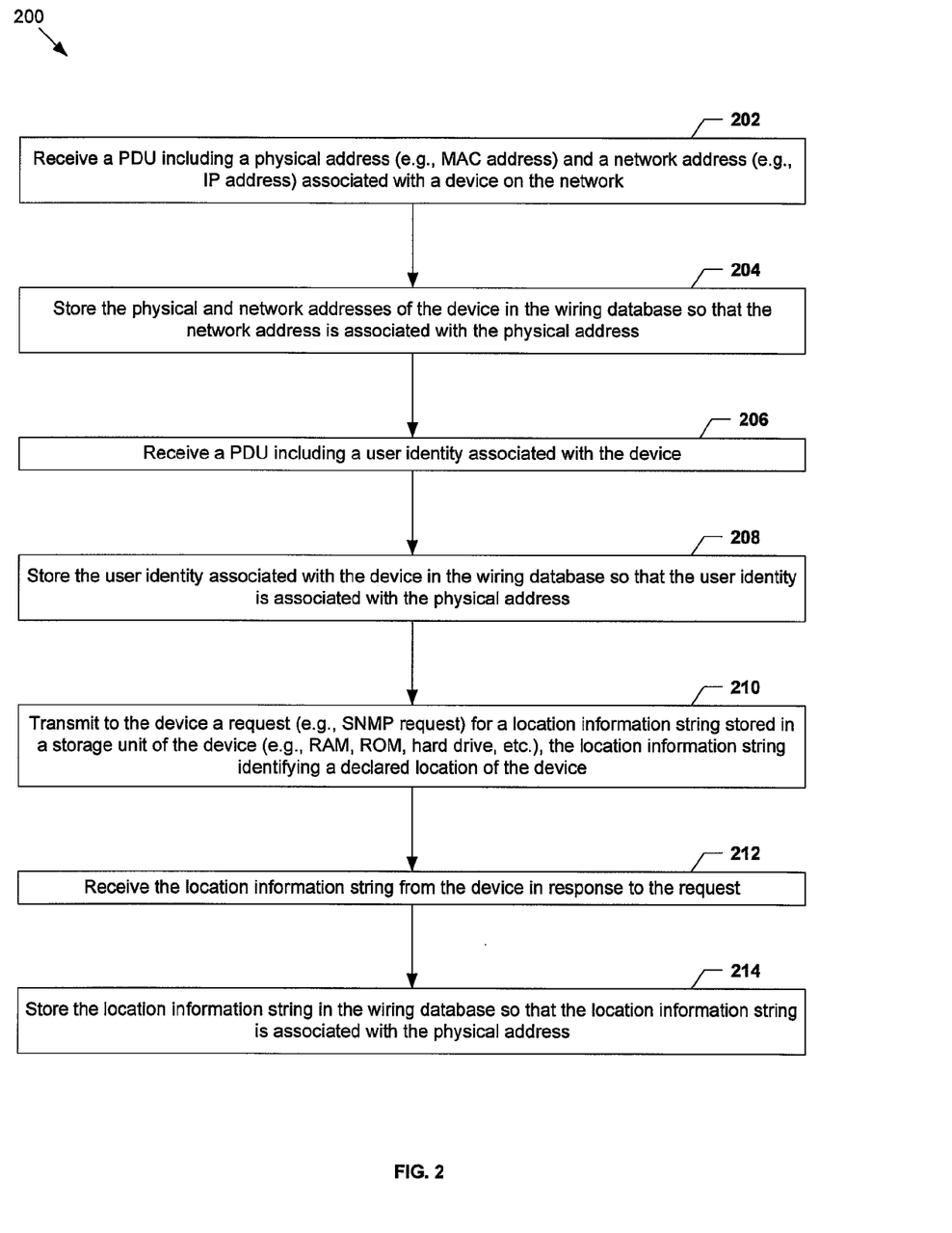
FIG. 2 is a flow chart illustrating a process for determining a physical location of a device on a network.

Referring now to FIG. 2, FIG. 2 is a flow chart that illustrates a process 200 for determining a physical location of a device 102 on a network. In some embodiments, process 200 may be performed by the supervisor computer 101. The process 200 may begin at step 202 when the supervisor computer receives a protocol data unit ("PDU") including a physical layer address (e.g., a media access control ("MAC") address) of the device 102. In some embodiments, the device 102 may be connected to the network 100 using the Ethernet protocol. Each Ethernet frame (i.e., Ethernet PDU) transmitted by the device 102 includes the MAC address of the device 102. In embodiments wherein the supervisor computer 101 is on the same Ethernet segment as the device 102, the PDU received in step 202 may be any Ethernet frame transmitted by the device 102. In embodiments wherein the supervisor computer 101 is on a separate Ethernet segment from the device 102, a network switch 104 that is on the same Ethernet segment as the device 102 may be configured to forward a PDU (e.g., a DHCP request message) including the MAC address of the device 102 to the supervisor computer 101. In other embodiments wherein the supervisor computer 101 is on a separate Ethernet segment from the device 102, the PDU received in step 202 may be a DHCP helper packet.

In some embodiments, the network 100 is an IP network. In these embodiments, the PDU received at step 202 also includes a network address (e.g., an IP address) of the device 102. For example, the PDU received in step 202 may be any IP packet transmitted by the device 102. In these embodiments, the device 102 transmits an IP packet encapsulated in an Ethernet frame, so that the IP and Ethernet addresses are both observed.

In response to observing the PDU, the supervisor computer 101 stores the physical layer address included in the received PDU in a wiring database (step 204) and may also store the network address so that it associated with the physical layer address.

At step 206, the supervisor computer 101 may receive a PDU including a user identity associated with the device 102. In some embodiments, the PDU received in step 206 may be part of a login sequence according to the terminal access controller access-control system ("TACACS").

In response to receiving the PDU, the supervisor computer 101 stores the user identity included in the PDU in the wiring database so that it associated with the physical layer address of the device 102 (step 208).

At step 210, the supervisor computer 101 transmits a request for location information (a.k.a., "a location string") that identifies a declared physical location of the device. In some embodiments, the location string may be stored in a data store on the device 102. In these embodiments, the request for location information may comprise a Simple Network Management Protocol (SNMP) "get" message directed to the device 102 (e.g., by using the network address of the device obtained in step 202). In other embodiments, different protocols (e.g., NETCONF) may be used.

The SNMP get message transmitted at step 210 causes the device 102 to retrieve the requested location string from a data store. In some embodiments, the location string may be stored in a Management Information Base ("MIB") of the device 102. In other embodiments, other types of data structures may be used to store management information. For example, in some embodiments XML-based management formats may be used to store the location string on the device 102. In some embodiments, the location string may be stored in the NetBIOS name of the device.

In other embodiments, the data store containing the location string uniquely tied to the device 102 may be on a data storage device remote from the device 102. For example, the data store may be a location database including one or more location strings, each of which is uniquely associated with a network device 102. In such embodiments, the request for location information may comprise a query transmitted to the location database.

The location string may contain a port label, a room number, a wall receptacle identifier, a unique datacenter location identifier, or some other indication uniquely defining a physical location for the device 102. For example, in some embodiments a location string indicating the second connector on connector block 1 in room 753 may be indicated by 753-01-02. In another embodiment the fifth port on the second row of the fourth patch panel in a communication room on a sixth floor may be indicated by the location string "06-402.05".

In some embodiments, the location string may be initially set by the network administrator while installing the device 102, or may be remotely set by the network administrator using an SNMP "set" command. In some preferred embodiments, once in the computer's MIB, this location string is nonvolatile, i.e. it remains unchanged until purposely modified. In some preferred embodiments, the location string cannot be modified by the end-users of the device 102, but may be modified by a network administrator.

At step 212, the supervisor computer 101 receives the requested location information. In some embodiments, receiving the requested location information may comprise receiving a response from the device 102 to the SNMP query directed at the device 102. In other embodiments, receiving the requested location information may comprise receiving the result of a query to the location database.

In response to receiving the requested location information, the supervisor computer 101 stores the location information in the wiring database so that it associated with the physical layer address of the device 102 (step 214).

As described, the process 200 may be used to create a wiring database for a network 100. The wiring database stores associations between the physical layer address of a device 102 and the physical location of the device 102. The wiring database may also store associations between the physical layer address of the device 102 and a network address of the device 102, topology information, and associations between the physical layer address of the device 102 and a user identity associated with the device 102.

In some embodiments, portions of process 200 may be omitted. For example, in some embodiments, the supervisor computer 101 may not store a network address of the device 102. In these embodiments, steps 206 and 208 may be omitted, but the querying of the data store for the location information is preferably carried out by a protocol that does not require a network address (e.g., SNMP over Ethernet). In other embodiments, the supervisor computer may not store a user identity associated with the device 102. In these embodiments, steps 210 and 212 may be omitted.

In some embodiments, the supervisor computer 101 or another network node may query intermediate network elements, such as the network switches 104. The network switches 104 may be at known locations, (e.g., in communications cabinets or rooms). The supervisor computer 102 may retrieve connectivity information from these intermediate elements, and can reconstruct topology information of the network 100 using known methods.

Figure 3:
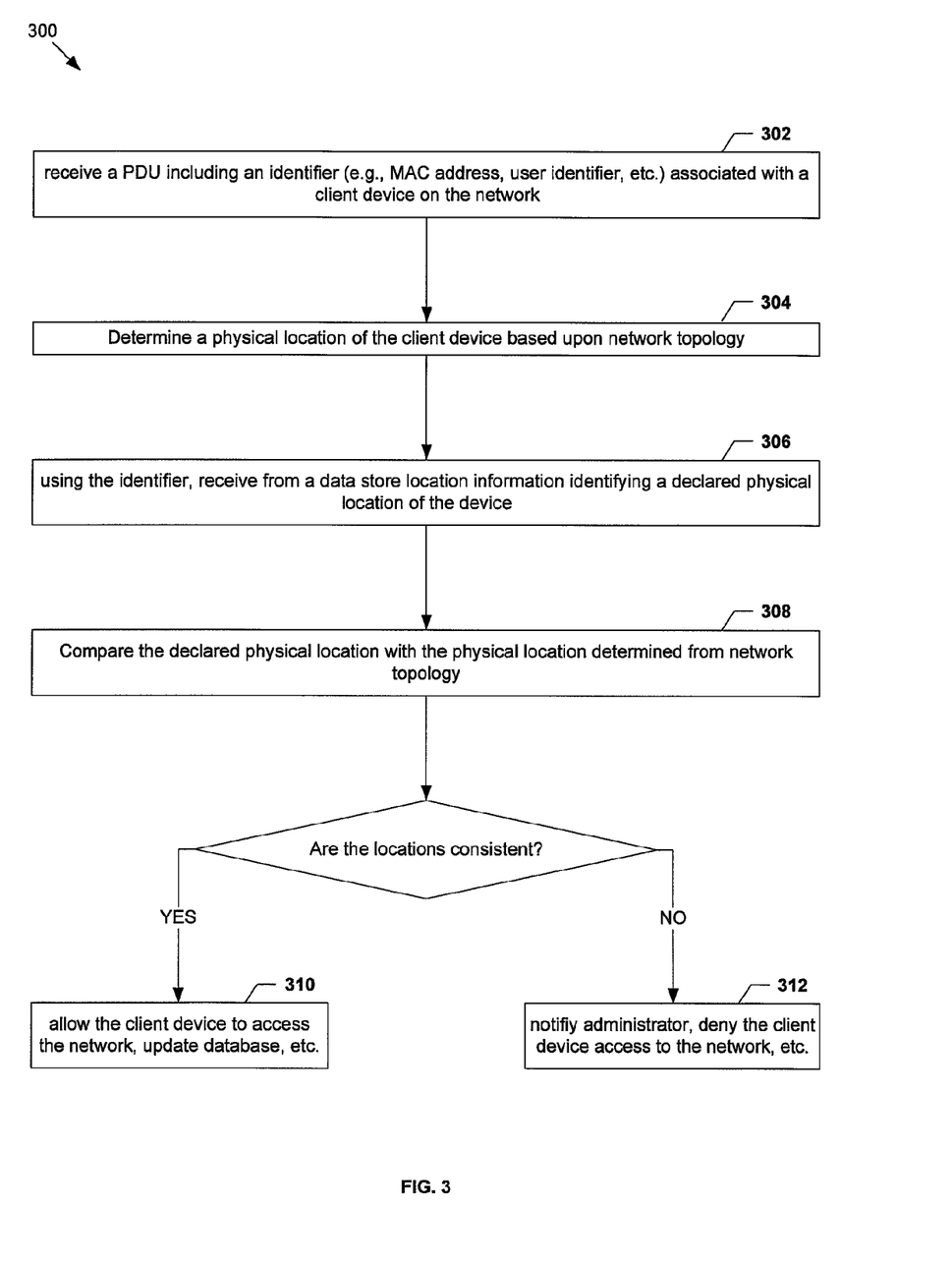
FIG. 3 is a flow chart illustrating a process for detecting and addressing inconsistencies in the wiring database using topology information.

Referring now to FIG. 3, FIG. 3 is a flow chart that illustrates a process 300 for detecting inconsistencies in the wiring database using topology information. Topology may be discovered by any technique well known to those versed in the art. In some embodiments, the process 300 may be carried out by the supervisor computer 101. The process 300 may begin at step 302 when the supervisor computer 101 receives a PDU including an identifier associated with a device 102. In some embodiments, the identifier may be the MAC address of the device 102. In other embodiments, the identifier may be another identifier associated with the device 102 (e.g., the network address of the device 102 or a user identity associated with the device 102).

At step 304, the supervisor computer uses network topology information to determine an approximate physical location of the device. For example, the topology information may indicate that the device is connected to a network switch 104 in a known physical location, or may limit the possible physical locations.

At step 306, the supervisor computer uses the identifier received in step 302 to retrieve from a data store location information identifying a declared physical location of the device 102 (e.g., a location at which device 102 is expected to be located). In some embodiments, this may comprise performing an SNMP query of the device 102 to retrieve the location string, as described with regard to steps 214 and 216 of the process 200. In some embodiments, the records in the wiring database may be used to correlate the identifier received in step 302 with another identifier of the device 102. For example, the identifier received in step 302 may comprise a MAC address of the device 102, and the supervisor computer 101 may use the wiring database records to determine a network address of the device 102 for performing an SNMP query.

At step 308, the approximate physical location information determined from the network topology information is compared with the declared physical location information retrieved from the data store in step 306.

In the case that the location information obtained in step 306 is consistent with that indicated by the discovered topology (i.e., the physical location determined from the network topology information is consistent with the location information set by the network administrator and/or stored in the wiring database), it may be concluded that the device 102 is at an expected location. In response to verifying consistent location information, a predetermined action may be taken (step 310). For example, in some embodiments, the supervisor computer 101 may authorize the device 102 to access network resources or may store the verified physical location information in the wiring database so that it is associated with the physical layer address of the device 102.

In the case where the location information obtained in step 306 is not consistent with a location determined from network topology information (e.g., a retrieved location string indicates that the device 102 is declared to be in a room on a sixth floor, but the location determined from network topology indicates that the device 102 is connected to a network switch 104 on the fourth floor), it may be concluded that the device 102 is not at the expected location. In response to detecting inconsistent location information, various predetermined actions may be taken (step 312). For example, in some embodiments, the supervisor computer 101 may deny network access to the device 102, revoke a network address (e.g., IP address) allocated to the device 102, or revoke a login state of a user logged in through the device 102.

In some embodiments, step 312 may also occur if the device 102 returns an invalid location string, or if the device 102 is not configured to provide a location string (e.g., if the SNMP agent of the service 102 is disabled).

When the supervisor computer performs the predetermined action at step 312, this may encourage a user of the device 102 to contact the network administrator (e.g., in order to gain authorized access to the network). This feature ensures that the wiring database is kept up to date.

In some embodiments, the supervisor computer may compare the identifier received at step 302 against additional information in the data store. For example, if the identifier is a user identity, the supervisor computer may compare this user identity with a a list of users permitted to use device 102. For example, if a user is logged on to another user's computer, access to network resources accessible to the usual user may be denied.

Figure 4:
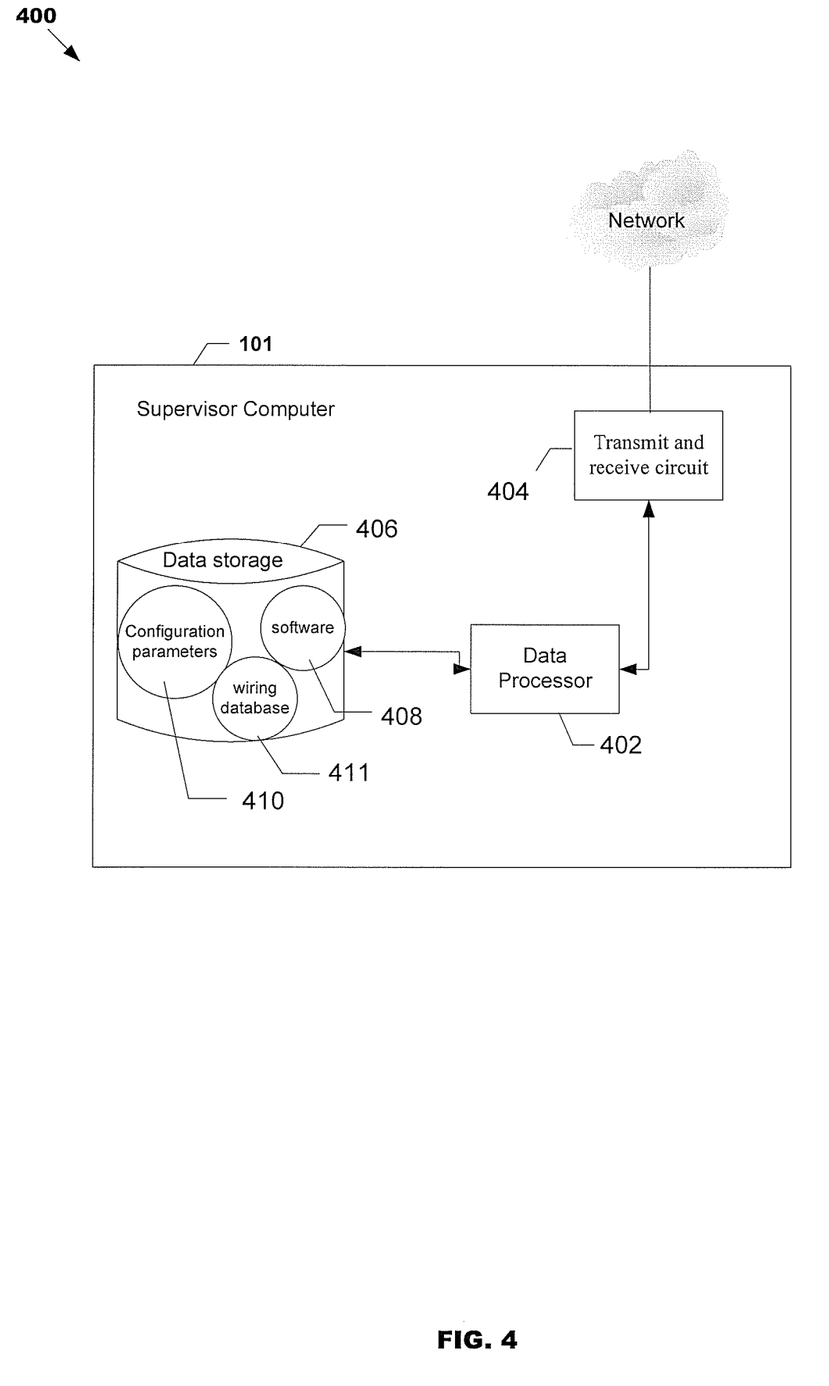
FIG. 4 is a block diagram of a supervisor computer.

Referring now to FIG. 4, FIG. 4 is a functional block diagram of the supervisor computer 101 according to some embodiments of the invention. As shown, the supervisor computer 104 may comprise a data processing system 402 (e.g., one or more microprocessors), a data storage system 406 (e.g., one or more non-volatile storage devices) and computer software 408 stored on the storage system 406. Configuration parameters 410 and the wiring database 411 may also be stored in storage system 406. The supervisor computer 101 also includes transmit/receive (Tx/Rx) circuitry 404 for transmitting data to and receiving data from the network 100. The software 408 is configured such that when the processor 402 executes the software 408, the supervisor computer 101 performs steps described above with reference to the flow charts. For example, software 408 may include: (1) computer instructions for receiving a protocol data unit (PDU) comprising an address associated with a device; (2) computer instructions for transmitting to the device a request for location information stored in a data store on the device, the location information identifying a declared physical location of the device; (3) computer instructions for receiving from the device the requested location information; and (4) computer instructions for storing the received location information in a database such that the received location information is linked with the address of the device.

Figure 5:
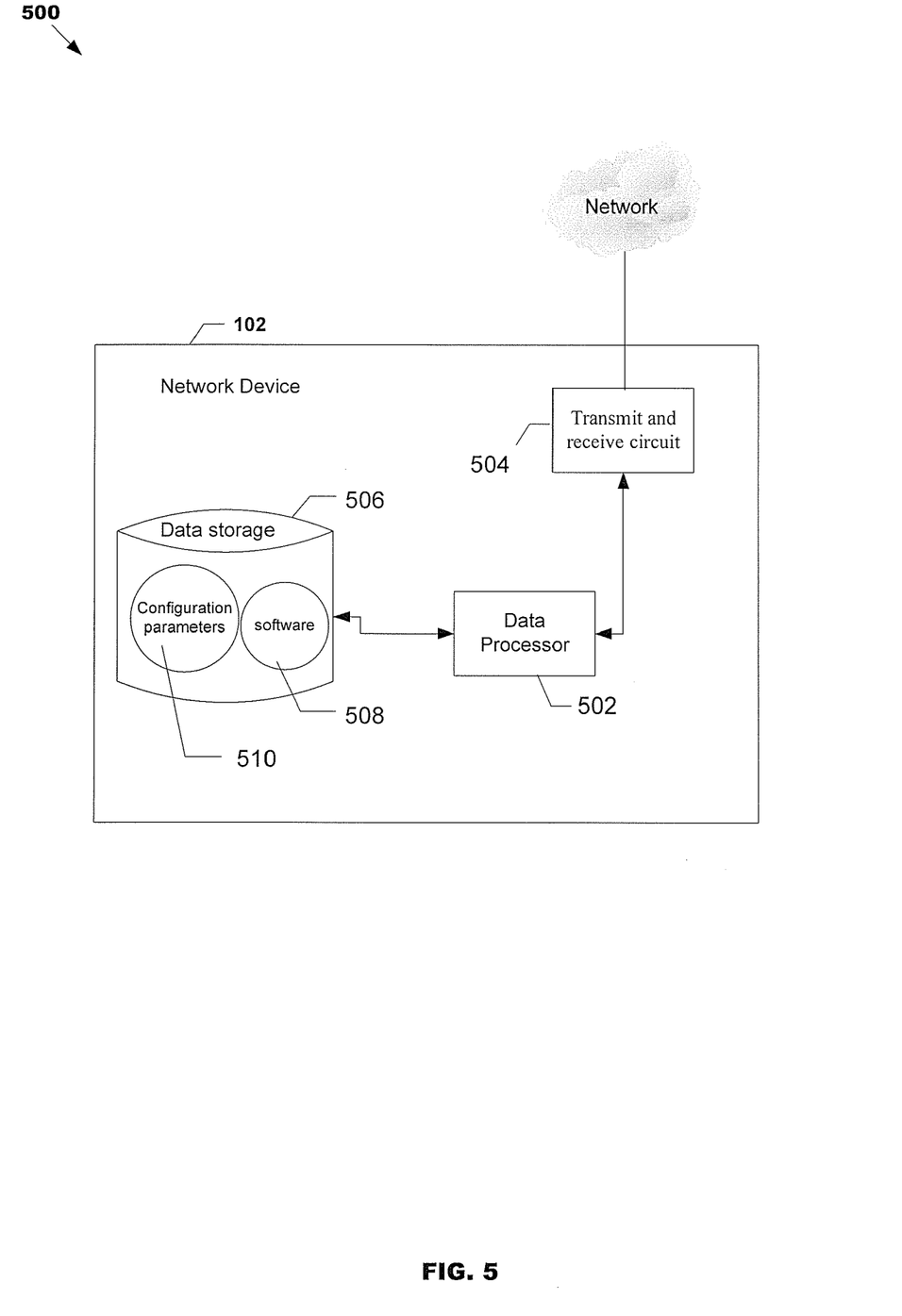
FIG. 5 is a block diagram of a network device.

Referring now to FIG. 5, FIG. 5 is a functional block diagram of a device 102 according to some embodiments of the invention. As shown, the device 102 may comprise a data processing system 502 (e.g., one or more microprocessors), a data storage system 506 (e.g., one or more non-volatile storage devices) and computer software 508 stored on the storage system 506. Configuration parameters 510 (e.g., a management information base) may also be stored in storage system 506. The device 102 also includes transmit/receive (Tx/Rx) circuitry 504 for transmitting data to and receiving data from the network 100.

While various embodiments of the present invention have been described above, it should be understood that they have been presented by way of example only, and not limitation. Thus, the breadth and scope of the present invention should not be limited by any of the above described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for determining the physical location of a device connected to a network, comprising:
   (a) receiving a protocol data unit (PDU) comprising an address associated with the device;
   (b) after step (a), transmitting to the device a request for location information stored in a data store on the device;
   (c) receiving from the device the requested location information, wherein the received location information comprises a name assigned to the device or a substring of the name, and the name assigned to the device, or the substring of the name, comprises a location string defining a physical location; and
   (d) storing the received location information in a database such that the received location information is linked with the address of the device.

2. The method of claim 1, wherein the address is a physical layer address.

3. The method of claim 2, wherein the physical layer address is an Ethernet media access control (MAC) address.

4. The method of claim 1, wherein the PDU is a Dynamic Host Configuration Protocol ("DHCP") request message.

5. The method of claim 1, further comprising:
   (e) after step (a) and prior to step (b), obtaining a network address of the device, wherein
   the step of transmitting the request comprises transmitting the request to the network address.

6. The method of claim 5, wherein the network address is an Internet protocol (IP) address.

7. The method of claim 1, further comprising:
   (e) receiving a PDU comprising a unique user identity associated with the device; and
   (f) storing the received location information in a database such that the received location information is linked with the user identity associated with the device.

8. The method of claim 7, wherein the PDU comprising a unique user identity associated with the device is part of a login sequence according to the terminal access controller access-control system (TACACS) protocol.

9. The method of claim 1, wherein the step of transmitting a request to the device for location information comprises transmitting a simple network management protocol (SNMP) protocol data unit (PDU) to the device.

10. The method of claim 1, wherein the location information stored in a data store on the device is textual information.

11. The method of claim 1, wherein the data store is not modifiable by an end user of the device.

12. The method of claim 1, wherein the data store comprises an Open Systems Interconnection ("OSI") network management model Management Information Base ("MIB").

13. The method of claim 1, wherein the data store comprises a NetBIOS Name of the device.

14. The method of claim 1, wherein the data store comprises NETCONF configuration data.

15. The method of claim 1, further comprising:
(e) determining a physical location of the device using topology information regarding the network.

16. The method of claim 15, further comprising:
(f) determining whether the location information obtained in step (c) is consistent with the physical location determined in step (e); and
(g) in response to determining that the location information obtained in step (c) is inconsistent with the physical location determined in step (e), performing a pre-determined action.

17. The method of claim 16, wherein the pre-determined action comprises denying the device access to a resource.

18. The method of claim 16, wherein the pre-determined action comprises revoking an Internet protocol (IP) address allocated to the device.

19. The method of claim 16, wherein the pre-determined action comprises revoking a login state of a user logged in through the device.

20. A method for managing a network, comprising:
(a) using topology information regarding the network, determining a physical location of a device connected to the network;
(b) obtaining, from a data store, location information associated with the device, said location information identifying a declared physical location of the device;
(c) determining whether the location information obtained in step (b) is consistent with the physical location determined in step (a); and
(d) in response to determining that the location information obtained in step (b) is inconsistent with the physical location determined in step (a), denying the device access to a resource.

21. The method of claim 20, wherein the denying the device access to a resource comprises revoking an Internet protocol (IP) address allocated to the device.

22. The method of claim 20, wherein denying the device access to a resource comprises revoking a login state of a user logged in through the device.

23. A method for maintaining the integrity of a wiring diagram, comprising:
(a) using topology information regarding the network, determining a physical location of a device connected to the network;
(b) obtaining, from a data store on the device, location information associated with the device, said location information identifying a declared physical location of the device;
(c) determining whether the location information obtained in step (b) is consistent with the physical location determined in step (a); and
(d) in response to determining that the location information obtained in step (b) is inconsistent with the physical location determined in step (a), performing a pre-determined action.

24. The method of claim 23, wherein performing the pre-determined action comprises disabling the device, and further comprising a step of:
(e) enabling use of the device only after the wiring database entry is corrected.

25. The method of claim 23, wherein the step of obtaining, from a data store on the device, location information associated with the device comprises querying the device according to the simple network management protocol (SNMP).

26. The method of claim 23, wherein the data store is not modifiable by an end user of the device.

27. The method of claim 23, wherein the data store comprises an Open Systems Interconnection ("OSI") network management model Management Information Base ("MIB").

28. The method of claim 23, wherein the data store comprises a NetBIOS Name of the device.

29. The method of claim 23, wherein the data store comprises NETCONF configuration data.

30. A supervisor computer, comprising:
a transmit and receive circuit operable to:
receive via a communication network a protocol data unit (PDU) comprising an address associated with a device connected to the network,
transmit to the device via the communication network a request for location information stored in a data store on the device, and
receive from the device the requested location information, wherein the received location information comprises a name assigned to the device or a substring of the name, and the name assigned to the device, or the substring of the name, comprises a location string defining a physical location; and
a data processing system that is configured to store the received location information in a database such that the received location information is linked with the address of the device.

31. The supervisor computer of claim 30, wherein the address is a physical layer address.

32. The supervisor computer of claim 31 wherein the physical layer address is an Ethernet media access control (MAC) address.

33. The supervisor computer of claim 30, wherein the PDU is a Dynamic Host Configuration Protocol ("DHCP") request message.

34. The supervisor computer of claim 30, wherein the transmit and receive circuit is further configured to:
obtain a network address of the device, wherein
transmitting the request comprises transmitting the request to the network address.

35. The supervisor computer of claim 34, wherein the network address is an Internet protocol (IP) address.

36. The supervisor computer of claim 30, wherein:
the transmit and receive circuit is further operable to receive a PDU comprising a unique user identity associated with the device; and
the data processing system is further operable to store the received location information in a database such that the received location information is linked with the user identity associated with the device.

37. The supervisor computer of claim 36, wherein the PDU comprising a unique user identity associated with the device is part of a login sequence according to the terminal access controller access-control system (TACACS) protocol.

38. The supervisor computer of claim 30, wherein transmitting a request to the device for location information comprises transmitting a simple network management protocol (SNMP) protocol data unit (PDU) to the device.

39. The supervisor computer of claim 30, wherein the location information stored in a data store on the device is textual information.

40. The supervisor computer of claim 30, wherein the data store is not modifiable by an end user of the device.

41. The supervisor computer of claim 30, wherein the data store comprises an Open Systems Interconnection ("OSI") network management model Management Information Base ("MIB").

42. The supervisor computer of claim 30, wherein the data store comprises a NetBIOS Name of the device.

43. The supervisor computer of claim 30, wherein the data store comprises NETCONF configuration data.

44. The supervisor computer of claim 30, wherein the data processing system is further configured to:
determine a physical location of the device using topology information regarding the network.

45. The supervisor computer of claim 44, wherein the data processing system is further configured to:
determine whether the location information obtained from the data store is consistent with the physical location inferred from the topology information; and
in response to determining that the location information is inconsistent, perform a pre-determined action.

46. The supervisor computer of claim 45, wherein the pre-determined action comprises denying the device access to a resource.

47. The supervisor computer of claim 45, wherein the pre-determined action comprises revoking an Internet protocol ("IP") address allocated to the device.

48. The supervisor computer of claim 45, wherein the pre-determined action comprises revoking a login state of a user logged in through the device.

49. A supervisor computer, comprising a data processing system that is configured to:
determine a physical location of a device connected to the network using topology information regarding the network;
obtain, from a data store, location information associated with the device, wherein the obtained location information comprises a name assigned to the device or a substring of the name, and the name assigned to the device, or the substring of the name, comprises a location string defining a physical location;
determine whether the physical location defined by the location string is consistent with the physical location determined from the topology information; and
in response to determining that the physical location defined by the location string is inconsistent, deny the device access to a resource.

50. The supervisor computer of claim 49, wherein the denying the device access to a resource comprises revoking an Internet protocol (IP) address allocated to the device.

51. The supervisor computer of claim 49, wherein denying the device access to a resource comprises revoking a login state of a user logged in through the device.

52. A supervisor computer, comprising a data processing system that is configured to:
determine a physical location of a device connected to the network using topology information regarding the network;
obtain, from a data store on the device, location information associated with the device, said location information identifying a declared physical location of the device;
determine whether the location information obtained from the data store is consistent with the physical location determined from the topology information; and
in response to determining that the location information is inconsistent, perform a pre-determined action.

53. The method of claim 52, wherein performing the pre-determined action comprises disabling the device.

54. The supervisor computer of claim 52, wherein the step of obtaining, from a data store on the device, location information associated with the device comprises querying the device according to the simple network management protocol ("SNMP").

55. The supervisor computer of claim 52, wherein the data store is not modifiable by an end user of the device.

56. The supervisor computer of claim 52, wherein the data store comprises an Open Systems Interconnection ("OSI") network management model Management Information Base ("MIB").

57. The supervisor computer of claim 52, wherein the data store comprises a NetBIOS Name of the device.

58. The supervisor computer of claim 52, wherein the data store comprises NETCONF configuration data.

59. The method of claim 1, wherein the location string comprises one or more of: a port label, a datacenter identifier, a room number, and a wall receptacle identifier.

60. The method of claim 59, wherein the name can be used to resolve and IP address assigned to the device.

61. The method of claim 59, wherein the name is a NetBios name.

* * * * *